United States Patent
Nakanishi et al.

(10) Patent No.: US 11,251,462 B2
(45) Date of Patent: *Feb. 15, 2022

(54) BATTERY SEPARATOR, LITHIUM BATTERY AND METHODS FOR PRODUCING THEM

(71) Applicant: Toyota Jidosha Kabushiki Kaisha, Toyota (JP)

(72) Inventors: Shinji Nakanishi, Mishima (JP); Shingo Ohta, Susono (JP)

(73) Assignee: TOYOTA JIDOSHA KABUSHIKI KAISHA, Toyota Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/232,635

(22) Filed: Dec. 26, 2018

(65) Prior Publication Data

US 2019/0207250 A1 Jul. 4, 2019

(30) Foreign Application Priority Data

Dec. 28, 2017 (JP) .............................. JP2017-253809

(51) Int. Cl.
*H01M 10/0562* (2010.01)
*H01M 10/0525* (2010.01)
(Continued)

(52) U.S. Cl.
CPC ......... *H01M 10/0562* (2013.01); *C04B 35/00* (2013.01); *H01M 10/052* (2013.01);
(Continued)

(58) Field of Classification Search
CPC ......... H01M 10/0525; H01M 10/0562; H01M 10/0585; H01M 2/145; H01M 2/166
See application file for complete search history.

(56) References Cited

U.S. PATENT DOCUMENTS 6,531,423 B1 * 3/2003 Schwetz ............... C04B 35/575
501/89
6,645,675 B1 * 11/2003 Munshi .................. H01B 1/122
252/62.2

(Continued)

FOREIGN PATENT DOCUMENTS

CN 102292849 A 12/2011
CN 103403946 A 11/2013
(Continued)

OTHER PUBLICATIONS

Office Action dated Oct. 18, 2019 in U.S. Appl. No. 16/126,137.
(Continued)

*Primary Examiner* — Sarah A. Slifka
*Assistant Examiner* — Rachel L Zhang
(74) *Attorney, Agent, or Firm* — Dinsmore & Shohl LLP

(57) ABSTRACT

Provided are a battery separator with less voids, a lithium battery comprising the battery separator, and methods for producing them. A battery separator comprising an oxide electrolyte sintered body and a resin, wherein the oxide electrolyte sintered body has grain boundaries between crystal particles of a garnet-type ion-conducting oxide; wherein a number average particle diameter of the crystal particles is 3 μm or less; and wherein the oxide electrolyte sintered body satisfies the following formula 1:

$R_{gb}/(R_b+R_{gb}) \leq 0.6$   Formula 1 where $R_b$ is an intragranular resistance value that is an ion conductivity resistance inside the crystal particles, and $R_{gb}$ is a grain boundary resistance value that is an ion conductivity resistance of the grain boundaries between the crystal particles.

8 Claims, 2 Drawing Sheets

(51) Int. Cl.
*H01M 2/16* (2006.01)
*H01M 10/0585* (2010.01)
*H01M 10/052* (2010.01)
*H01M 10/056* (2010.01)
*C04B 35/00* (2006.01)
*H01M 50/403* (2021.01)
*H01M 50/446* (2021.01)

(52) U.S. Cl.
CPC ..... *H01M 10/056* (2013.01); *H01M 10/0525* (2013.01); *H01M 10/0585* (2013.01); *H01M 50/403* (2021.01); *H01M 50/446* (2021.01); *H01M 2300/0071* (2013.01)

(56) References Cited

U.S. PATENT DOCUMENTS

| | | | |
|---|---|---|---|
| 8,986,895 | B2 | 3/2015 | Ohta et al. |
| 9,531,036 | B2 | 12/2016 | Ohta et al. |
| 2007/0259271 | A1 | 11/2007 | Nanno et al. |
| 2010/0233547 | A1 | 9/2010 | Baba et al. |
| 2011/0244337 | A1* | 10/2011 | Ohta .................. C04B 35/481 429/319 |
| 2012/0276457 | A1 | 11/2012 | Hirose et al. |
| 2013/0266842 | A1 | 10/2013 | Woehrle et al. |
| 2013/0323604 | A1 | 12/2013 | Teshima et al. |
| 2014/0017577 | A1 | 1/2014 | Minami et al. |
| 2014/0099528 | A1* | 4/2014 | Lockett .................. H01M 4/06 429/124 |
| 2014/0162113 | A1 | 6/2014 | Ohta et al. |
| 2014/0227614 | A1 | 8/2014 | Lee et al. |
| 2015/0056519 | A1* | 2/2015 | Ohta ................. H01M 10/0562 429/320 |
| 2015/0099188 | A1 | 4/2015 | Holme et al. |
| 2015/0111110 | A1 | 4/2015 | Watanabe et al. |
| 2015/0280296 | A1 | 10/2015 | Kang et al. |
| 2016/0211498 | A1 | 7/2016 | Kim et al. |
| 2017/0062823 | A1 | 3/2017 | Yamaguchi et al. |
| 2017/0117547 | A1 | 4/2017 | Fanous et al. |
| 2017/0222254 | A1 | 8/2017 | Sakamoto et al. |
| 2017/0271639 | A1 | 9/2017 | Yoshima et al. |
| 2017/0309916 | A1* | 10/2017 | Toyoda .................. H01M 4/62 |
| 2017/0346092 | A1 | 11/2017 | Yada et al. |
| 2017/0358829 | A1 | 12/2017 | Inoue et al. |
| 2018/0175446 | A1 | 6/2018 | Nishizaki et al. |
| 2018/0219253 | A1 | 8/2018 | Ohta |
| 2018/0248201 | A1 | 8/2018 | Shimoda et al. |
| 2019/0074543 | A1 | 3/2019 | Houjyou et al. |
| 2019/0088993 | A1 | 3/2019 | Ohta |
| 2019/0207248 | A1 | 7/2019 | Ohta |
| 2019/0207249 | A1 | 7/2019 | Nakanishi et al. |

FOREIGN PATENT DOCUMENTS

| | | |
|---|---|---|
| CN | 103904290 A | 7/2014 |
| CN | 104272518 A | 1/2015 |
| CN | 105811006 A | 7/2016 |
| CN | 106486671 A | 3/2017 |
| CN | 107437633 A | 12/2017 |
| EP | 3252024 A1 | 12/2017 |
| EP | 3410529 A1 | 12/2018 |
| JP | 2001-210360 A | 8/2001 |
| JP | 2007-005279 A | 1/2007 |
| JP | 2010-056027 A | 3/2010 |
| JP | 2012-096940 A | 5/2012 |
| JP | 2012-174659 A | 9/2012 |
| JP | 2013-037992 A | 2/2013 |
| JP | 2013-532361 A | 8/2013 |
| JP | 2013-219017 A | 10/2013 |
| JP | 2013-232284 A | 11/2013 |
| JP | 2015-060737 A | 3/2015 |
| JP | 2016-517157 A | 6/2016 |
| JP | 2016-171068 A | 9/2016 |
| JP | 2017-033926 A | 2/2017 |
| JP | 2017168317 A | 9/2017 |
| JP | 2017-216222 A | 12/2017 |
| KR | 10-2017-0134231 A | 12/2017 |
| WO | 2012114193 A1 | 8/2012 |
| WO | 2014176266 A1 | 10/2014 |
| WO | 2016/210371 A1 | 12/2016 |
| WO | 2017/015511 A1 | 1/2017 |
| WO | 2017018217 A1 | 2/2017 |
| WO | 2017130622 A1 | 8/2017 |

OTHER PUBLICATIONS

Yow, Zhen Feng et al., "Effect of Li+/H+ exchange in water treated Ta-doped Li7La3Zr2O12", Solid State Ionics 292, 2016, p. 122-129.

Awaka, Junji et al., "Synthesis and structure analysis of tetragonal Li7La3Zr2O12 with the garnet-related type structure", Journal of Solid State Chemistry, 2009, p. 2046-2052, vol. 182, No. 8, Aug. 1, 2009.

Awaka, Junji et al., "Single Crystal Synthesis of Cubic Garnet Related-Type Li7La3Zr2O12 by a Self-Flux Method", Key Engineering Materials, Jul. 4, 2011, p. 99-102, vol. 485.

Roof, Irina P. et al., "Crystal growth of a series of lithium garnets Ln3Li5Ta2O12 (Ln=La, Pr, Nd): Structural properties, Alexandrite effect and unusual ionic conductivity", Journal of Solid State Chemistry, Feb. 1, 2009, p. 295-300, vol. 182, No. 2.

Office Action dated Jan. 28, 2020 in U.S. Appl. No. 16/121,030.
Notice of Allowance dated May 19, 2020 in U.S. Appl. No. 16/121,030.
Office Action dated Oct. 18, 2019 in U.S. Appl. No. 16/232,631.
Office Action dated Apr. 16, 2020 in U.S. Appl. No. 16/232,631.
Office Action dated Apr. 24, 2020 in U.S. Appl. No. 16/126,137.
Office Action dated May 19, 2020 in U.S. Appl. No. 16/121,030.
Notice of Allowance dated Nov. 25, 2020 in U.S. Appl. No. 16/126,137.

"Crystal chemistry of 'Li7La3Zr2O12' garnet doped with Al, Ga, and Fe: a short review on local structures as revealed by NMR and Mößbauer spectroscopy studies", Daniel Rettenwander et al., European Journal of Mineralogy, vol. 28, No. 3, p. 619-629, May 11, 2016.

Office Action dated Oct. 27, 2020 in U.S. Appl. No. 16/232,631.
Notice of Allowance dated Apr. 1, 2021 in U.S. Appl. No. 16/232,631.
Notice of Allowance dated Jun. 3, 2021 in U.S. Appl. No. 16/126,137.

G. Larraz et al., Cubic phases of garnet-type Li7La3Zr2O12: the role of hydration, Journal of Materials Chemistry A, vol. 1, No. 37, pp. 11419-11428.

U.S. Notice of Allowance dated Sep. 22, 2021, in U.S. Appl. No. 16/126,137.

* cited by examiner

1. Exchange (Li⁺ → H⁺)    2. Re-exchange (H⁺ → Li⁺)

BATTERY SEPARATOR, LITHIUM BATTERY AND METHODS FOR PRODUCING THEM

CROSS REFERENCE TO RELATED APPLICATIONS

This application claims priority to Japanese Patent Application No. 2017-253809 filed on Dec. 28, 2017, the entire contents of which are hereby incorporated by reference in including the specification, drawings and abstract.

TECHNICAL FIELD

The disclosure relates to a battery separator, a lithium battery comprising the battery separator, and methods for producing them.

BACKGROUND

The use of inorganic solid electrolytes as a lithium battery separator, has been studied.

For example, to increase thermal stability, Patent Literature 1 discloses a lithium ion battery comprising a cathode, an anode, and a separator disposed between the cathode and the anode, the separator containing at least one inorganic solid electrolyte layer and using a garnet-type ion-conducting oxide as an inorganic solid electrolyte.

Patent Literature 1: Japanese translation of PCT international application No. 2013-532361

In the case of producing a separator by using a garnet-type ion-conducting oxide only, voids are always formed in its crystal structure, even if the separator is densely produced. It is known that a lithium dendrite is sometimes formed in a lithium battery and may grow in the separator of the battery when the voidage of the separator is high. Therefore, a separator with less voids is needed to suppress lithium dendrite growth.

SUMMARY

The disclosed embodiments were achieved in light of the above circumstance. An object of the disclosed embodiments is to provide a battery separator with less voids, a lithium battery comprising the battery separator, and methods for producing them.

In a first embodiment, there is provided a battery separator comprising an oxide electrolyte sintered body and a resin, wherein the oxide electrolyte sintered body has grain boundaries between crystal particles of a garnet-type ion-conducting oxide represented by the following general formula (A):

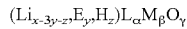  General Formula (A)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 \leq z \leq 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

wherein a number average particle diameter of the crystal particles is 3 μm or less; and wherein the oxide electrolyte sintered body satisfies the following formula 1:

$R_{gb}/(R_b+R_{gb}) \leq 0.6$  Formula 1 where $R_b$ is an intragranular resistance value that is an ion conductivity resistance inside the crystal particles, and $R_{gb}$ is a grain boundary resistance value that is an ion conductivity resistance of the grain boundaries between the crystal particles.

For the battery separator, the resin may be a resin that can melt at 350° C. or less.

For the battery separator, a thermal decomposition temperature of the resin may be 400° C. or more.

In another embodiment, there is provided a lithium battery comprising a cathode, an anode, and an electrolyte layer that is disposed between the cathode and the anode and comprises the battery separator.

In another embodiment, there is provided a method for producing a battery separator comprising an oxide electrolyte sintered body and a resin, the method comprising:

preparing crystal particles of a garnet-type ion-conducting oxide represented by the following general formula (B):

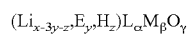  General Formula (B)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 < z \leq 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

preparing a lithium-containing flux;

preparing a resin;

forming a separator material layer comprising a mixture of the crystal particles of the garnet-type ion-conducting oxide, the flux and the resin; and sintering the separator material layer by heating at a temperature of 650° C. or less.

For the method for producing the battery separator, the heating temperature may be 350° C. or more in the sintering.

For the method for producing the battery separator, the resin may be a resin that melts and does not thermally decompose in the sintering.

In another embodiment, there is provided a method for producing a lithium battery comprising a cathode, an anode, and an electrolyte layer that is disposed between the cathode and the anode and comprises a battery separator obtained by the production method.

According to the disclosed embodiments, a battery separator with less voids, a lithium battery comprising the battery separator, and methods for producing them, can be provided.

BRIEF DESCRIPTION OF THE DRAWINGS

In the accompanying drawings.

DETAILED DESCRIPTION

1. Battery Separator

The battery separator of the disclosed embodiments, is a battery separator comprising an oxide electrolyte sintered body and a resin, wherein the oxide electrolyte sintered body has grain boundaries between crystal particles of a garnet-type ion-conducting oxide represented by the following general formula (A):

$$(Li_{x-3y-z}, E_y, H_z)L_\alpha M_\beta O_\gamma$$  General Formula (A)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

wherein a number average particle diameter of the crystal particles is 3 μm or less; and wherein the oxide electrolyte sintered body satisfies the following formula 1:

$$R_{gb}/(R_b + R_{gb}) \leq 0.6$$  Formula 1 where $R_b$ is an intragranular resistance value that is an ion conductivity resistance inside the crystal particles, and $R_{gb}$ is a grain boundary resistance value that is an Ion conductivity resistance of the grain boundaries between the crystal particles.

In the disclosed embodiments, the oxide electrolyte is a concept that encompasses the garnet-type ion-conducting oxide.

In the disclosed embodiments, the oxide electrolyte sintered body is a concept that encompasses the sintered body of the garnet-type ion-conducting oxide (or the garnet-type ion-conducting oxide sintered body).

In the disclosed embodiments, the garnet-type ion-conducting oxide not subjected to substitution of lithium ions with hydrogen ions, may be referred to as "garnet-type ion-conducting oxide not subjected to substitution with hydrogen ions".

In the disclosed embodiments, the garnet-type ion-conducting oxide subjected to substitution of part of lithium ions with hydrogen ions and not subjected to sintering, may be referred to as "garnet-type ion-conducting oxide subjected to substitution with hydrogen ions".

In the disclosed embodiments, the garnet-type ion-conducting oxide subjected to sintering may be referred to as "garnet-type ion-conducting oxide sintered body" or "sintered garnet-type ion-conducting oxide".

In the disclosed embodiments, the general formula (A) indicates at least the sintered garnet-type ion-conducting oxide.

In the disclosed embodiments, the below-described general formula (B) indicates the garnet-type ion-conducting oxide subjected to substitution with hydrogen ions.

Figure 1:
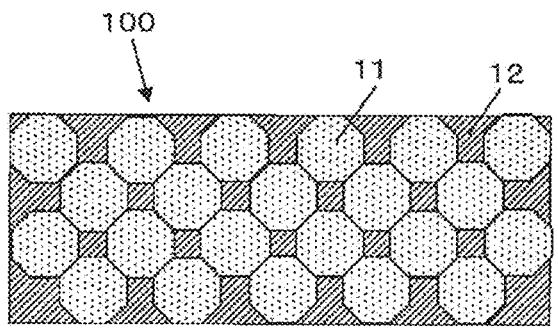
FIG. 1 is a schematic sectional view of an example of the battery separator of the disclosed embodiments.

FIG. 1 is a schematic sectional view of an example of the battery separator of the disclosed embodiments.

As shown in FIG. 1, a battery separator 100 is formed with a garnet-type ion-conducting oxide sintered body 11 and a resin 12 filling the voids of the garnet-type ion-conducting oxide sintered body 11.

Since the resin is contained in the voids of the garnet-type ion-conducting oxide sintered body, the battery separator of the disclosed embodiments has a small voidage, is dense, and has desired ion conductivity.

The battery separator comprising an oxide electrolyte sintered body and a resin.

The oxide electrolyte sintered body may contain the crystal particles of the garnet-type ion-conducting oxide represented by the general formula (A). It may further contain other conventionally-known electrolyte materials.

In the garnet-type ion-conducting oxide sintered body contained in the battery separator, hydrogen may be contained as an impurity. That is, hydrogen may be present in the composition of the garnet-type ion-conducting oxide, even if the garnet-type ion-conducting oxide is in the state of the sintered body obtained after sintering.

When the composition of the Li in the general formula (A) is x−3y−z>7, it is presumed that the crystal structure of the garnet-type ion-conducting oxide is changed from a cubic crystal structure to a tetragonal crystal structure, thereby impairing crystal symmetry and decreasing the lithium ion conductivity of the garnet-type ion-conducting oxide sintered body.

Meanwhile, when the composition of the Li in the general formula (A) is x−3y−z<3, it is presumed that the potential of the 96h site (a specific site in which the Li in the crystal structure of the garnet-type ion-conducting oxide will be incorporated) increases and makes it difficult for the Li to be incorporated in the crystal, thereby decreasing Li occupancy and decreasing the lithium ion conductivity of the garnet-type ion-conducting oxide sintered body.

As the element E, an element that is four-coordinated as with Li and has an ionic radius close to Li (Li: 0.59 Å) is used.

The garnet-type ion-conducting oxide used in the disclosed embodiments may contain, as the element E, at least one kind of element selected from the group consisting of Al, Ga, Fe and Si, at least one kind of element selected from the group consisting of Al and Ga, or an Al element.

In the disclosed embodiments, since the element E in the general formula (A) is contained in a range of $0 \leq y < 0.22$, the stability of the crystal structure of the garnet-type ion-conducting oxide can be increased, and the synthesis of the garnet-type ion-conducting oxide can be easy. When y is 0 or more, the stability of the crystal structure can be increased. On the other hand, when y is 0.22 or more, the particles may become too hard and affect formability.

From the viewpoint of increasing lithium ion conductivity, the viewpoint of increasing formability, and the viewpoint of densification, the element E in the general formula (A) may be contained in a range of $0 \leq y < 0.13$, or it may be contained in a range of $0 \leq y < 0.04$.

In the general formula (A), hydrogen H may be contained in a range of $0 \leq z < 3.4$. The fact that z is a real number satisfying $0 \leq z < 3.4$, indicates that hydrogen may be contained as an impurity. Also, z may be 0.

The element L contained in the garnet type ion-conducting oxide used in the disclosed embodiments, is not particularly limited, as long as it is at least one kind of element selected from the group consisting of an alkaline-earth metal and a lanthanoid element. This is because a small change in the crystal structure and high ion conductivity can be obtained. As used herein, the alkaline-earth metal is a concept that encompasses Ca, Sr, Ba and Ra. The element L may be La, since the ion conductivity can be further increased.

In the disclosed embodiments, as long as the element L of the general formula (A) is contained in a range of $2.5 \leq \alpha \leq 3.5$, the crystal structure of the garnet-type ion-conducting oxide is stabilized, and the lithium ion conductivity of the garnet-type ion-conducting oxide sintered body can be increased. Also, $\alpha$ may be 3.

The element M contained in the garnet-type ion-conducting oxide used in the disclosed embodiments, is not particularly limited, as long as it is at least one kind of element selected from a transition element that can be six-coordinated with oxygen and typical elements in groups 12 to 15 of the periodic table. This is because the crystal structure is stabilized, and the lithium ion conductivity of the garnet-type ion-conducting oxide sintered body is high.

In the disclosed embodiments, as long as the element M of the general formula (A) is contained in a range of $1.5 \leq \beta \leq 2.5$, the crystal structure of the garnet-type ion-conducting oxide is stabilized, and the lithium ion conductivity of the garnet-type ion-conducting oxide sintered body is high. Therefore, $\beta$ may be 2.

As the element M, examples include, but are not limited to, Sc, Y, Ti, Zr, Hf, V, Nb, Ta, Cr, Mo, W, Mn, Fe, Co, Ni, Cu, Zn, cd, Al, Ga, Ge, Sn, Sb and Bi.

The element M may be at least one kind of element selected from the group consisting of Zr, Nb and Ta, or it may be a combination of Zr with Nb or Ta, from the point of view that the crystal structure is stabilized, and the lithium ion conductivity of the garnet-type ion-conducting oxide sintered body is high.

When the element M is the combination of Zr with Nb or Ta, the amount of the Zr in the composition may be in a range of from 1.4 to 1.75, from the point of view that the crystal structure is stabilized, and the lithium ion conductivity of the garnet-type ion-conducting oxide sintered body is high.

On the other hand, when the element M is the combination of Zr with Nb or Ta, the amount of the Nb or Ta in the composition may be in a range of from 0.25 to 0.6, from the point of view that the crystal structure is stabilized, and the lithium ion conductivity of the garnet-type ion-conducting oxide sintered body is high.

In the disclosed embodiments, as long as the oxygen O contained in the composition of the garnet-type ion-conducting oxide is in a range of $11 \leq \gamma \leq 13$ in the general formula (A), the crystal structure of the garnet-type ion-conducting oxide is stabilized. Therefore, $\gamma$ may be 12.

In the battery separator of the disclosed embodiments, the number average particle diameter of the crystal particles of the garnet-type ion-conducting oxide sintered body may be 3 μm or less. The lower limit of the number average particle diameter is not particularly limited. From the viewpoint of handling, it may be 0.1 μm or more.

In the disclosed embodiments, the average particle diameter of the particles is calculated by a general method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEN or SEM observation is carried out on 200 to 300 particles of the same type, and the average of the particles is determined as the average particle diameter.

The resin contained in the battery separator of the disclosed embodiments may be a thermoplastic or thermosetting resin. It may be determined depending on the intended application.

In general, thermoplastic resin has better formability than thermosetting resin. Meanwhile, thermosetting resin has better mechanical strength than thermoplastic resin.

To sufficiently spread the resin into the voids, the resin may be in such a state at the time of heating (sintering), that the resin is melted and is not yet evaporated. The resin may be a resin with a lower melting temperature and a higher thermal decomposition temperature than the heating (sintering) temperature. For example, the melting temperature of the resin may be 450° C. or less, may be 350° C. or less, or may be 300° C. or less. The thermal decomposition temperature of the resin may be 400° C. or more, may be 450° C. or more, or may be 500° C. or more.

As the resin used in the disclosed embodiments, examples include, but are not limited to, resins with excellent heat resistance, such as polyimide resin, polybenzimidazole-based thermosetting resin and polysiloxane-based thermosetting resin.

The thickness of the battery separator may be 2000 μm or less, may be 1000 μm or less, may be 400 μm or less, or may be 100 μm or less. In this case, a reduction in battery size can be achieved. The lower limit of the thickness of the battery separator may be 10 μm or more, or may be 20 μm or more, from the viewpoint of handling.

In the disclosed embodiments, the crystal particles of the garnet-type ion-conducting oxide are bonded by a solid phase flux read, ion method, using a chemical reaction between the flux material and the crystal particles of the garnet-type ion-conducting oxide subjected to substitution with hydrogen ions (a solid phase) as a driving force.

Figure 2:
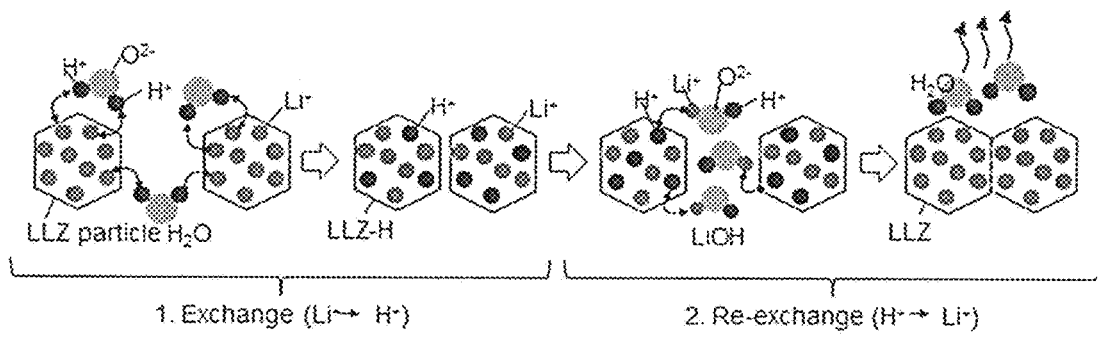
FIG. 2 is a schematic view showing the outline of a solid phase flux reaction method used in the disclosed embodiments.

FIG. 2 is a schematic view showing the outline of the solid phase flux reaction method used in the disclosed embodiments.

The left part ("1. Exchange ($Li^+ \rightarrow H^+$)") of FIG. 2 shows the states of the crystal particles of the garnet-type ion-conducting oxide before and after part of the lithium ions ($Li^+$) of the crystal particles are substituted with hydrogen ions ($H^+$). In FIG. 2, the garnet-type ion-conducting oxide not containing hydrogen is referred to as LLZ, and the garnet-type ion-conducting oxide containing hydrogen is referred to as LLZ-H.

The right part ("2. Re-exchange ($H^+ \rightarrow Li^+$)") of FIG. 2 shows the states of the crystal particles of the garnet-type ion-conducting oxide before and after the hydrogen ions ($H^+$) in the crystal particles of the garnet-type ion-conducting oxide are substituted with the lithium ions ($Li^+$) of the flux. When the mixture is heated to the melting point of the flux, bonding between the lithium ions ($Li^+$) and anions ($OH^-$ in FIG. 2) in the flux is weakened. At this time, the hydrogen ions ($H^+$) in the crystal particles of the garnet-type ion-conducting oxide are substituted with the lithium ions ($Li^+$) in the flux.

As shown by the right part ("2. Re-exchange ($H^+ \rightarrow Li^+$)") of FIG. 2, the lithium ions ($Li^+$) of the flux are incorporated into the crystal of the crystal particles of the garnet-type ion-conducting oxide. The hydrogen ions ($H^+$) released from the inside of the crystal of the crystal particles of the garnet-type ion-conducting oxide, bind to the anions ($OH^-$ in FIG. 2) of the flux, form a reaction product and move outside the system; therefore, they do not remain between the crystal particles of the sintered garnet-type ion-conducting oxide.

In the garnet-type ion-conducting oxide sintered body, the grain boundaries between the crystal particles of the garnet-type ion-conducting oxide sintered body and the inside of the crystal particles thereof conduct ions (e.g., lithium ions).

Accordingly, the ion conductivity of the garnet-type ion-conducting oxide sintered body is determined based on the sum of a grain boundary resistance and an intragranular resistance (that is, the total resistance).

For example, as the total resistance increases, the ion conductivity decreases. As the total resistance decreases, the ion conductivity increases.

In general, it Is considered that since ion conduction between the crystal particles is more difficult than ion conduction Inside the crystal particles, the grain boundary resistance is large compared to the intragranular resistance.

Therefore, as the ratio of the grain boundaries in the garnet-type ion-conducting oxide sintered body decreases, the ion conductivity of the garnet-type ion-conducting oxide sintered body increases.

In the disclosed embodiments, "$R_{gb}/(R_b+R_{gb})$" is a parameter that is used as an indicator to show the state between the crystal particles of the garnet-type ion-conducting oxide (that is, to show whether the oxide is sufficiently sintered or not).

In general, the grain boundary resistance formed by the crystal particles of the garnet-type ion-conducting oxide, is very small. On the other hand, it is known that the grain boundary resistance is very large when foreign substances or voids are present at grain boundaries of the crystal particles of the garnet-type ion-conducting oxide (for example, see "Solid Oxide Electrolytes", Frontiers in Energy Research, July 2016, Volume 4, Article 30). Also, it is known that the ion conductivity of the crystal particles of the garnet-type ion-conducting oxide is deteriorated by the presence of foreign substances or voids at the grain boundaries, and in this case, the parameter $(R_{gb}/(R_b+R_{gb})$ is more than 0.6.

For the ion conductivity inside the battery separator containing the garnet-type ion-conducting oxide sintered body of the disclosed embodiments, the ratio of the grain boundary resistance is 60% or less of the total resistance (the intragranular resistance+the grain boundary resistance), that is, $R_{gb}/(R_b+R_{gb}) \leq 0.6$. This fact indicates the following: since the crystal particles of the garnet-type ion-conducting oxide are bonded to form excellent interfaces and allow the resin to enter only the grain boundary triple junctions of the crystal particles, which are less likely to inhibit ion conductivity, the garnet-type ion-conducting oxide sintered body shows the same ion conductivity as a garnet-type ion-conducting oxide sintered body not containing a resin.

Meanwhile, in the case of the battery separator obtained by sintering the garnet-type ion-conducting oxide not subjected to substitution with hydrogen ions at 650° C. or less and then filling the voids with the resin, or in the case of the battery separator obtained by sintering the garnet-type ion-conducting oxide not subjected to substitution with hydrogen ions and the resin at the same time, the following are presumed: the crystal particles of the garnet-type ion-conducting oxide cannot be sufficiently bonded; the lithium ion conductivity is decreased; and the ratio of the grain boundary resistance with respect to the total resistance (the intragranular resistance+the grain boundary resistance) is more than 60%. As described above, since the garnet-type ion-conducting oxide sintered body has low lithium ion conductivity when the grain boundary resistance is more than 60%, low battery output is obtained when the garnet-type ion-conducting oxide sintered body is used in the battery separator. In addition, since the contact/bonding area of the crystal particles of the garnet-type ion-conducting oxide is small, there is the following disadvantage: when high current is applied to the battery, for example, intensive movement of ions occurs and becomes a cause of uneven reaction distribution in the battery.

The ratio $R_{gb}/(R_b+R_{gb})$ of the grain boundary resistance value $R_{gb}$ with respect to the total resistance value $R_b+R_{gb}=R_{total}$ (the sum of the intragranular resistance value $R_b$ and the grain boundary resistance value $R_{gb}$) can be calculated by AC impedance measurement.

According to the disclosed embodiments, since the garnet-type ion-conducting oxide is sintered at 650° C. or less, the crystal particles of the garnet-type ion-conducting oxide sintered body contained in the battery separator, can be present in such a state that the number average particle diameter is smaller (3 μm or less) than the case of sintering at high temperature (e.g., 1000° C.). This is because, due to the presence of the flux, low-temperature sintering is allowed, and abnormal grain growth of the garnet-type ion-conducting oxide can be suppressed.

Therefore, if it is confirmed by a SEM image, etc., that the number average particle diameter of the garnet-type ion-conducting oxide sintered body contained in the battery separator is 3 μm or less, the battery separator can be determined as a battery separator obtained by low-temperature sintering.

Also, if it is confirmed by a SEM image, etc., that the number average particle diameter of the garnet-type ion-conducting oxide sintered body contained in the battery separator is 3 μm or less, and if it is confirmed by AC impedance measurement that the parameter $R_{gb}/(R_b+R_{gb})$ of the battery separator is 0.6 or less, the battery separator can be determined as a battery separator obtained by the solid phase flux reaction method and low-temperature sintering.

The battery separator of the disclosed embodiments can be used in various kinds of batteries.

The battery separator may be used in a lithium battery.

2. Method for Producing Battery Separator

The method for producing a battery separator according to the disclosed embodiments is a method for producing a battery separator comprising an oxide electrolyte sintered body and a resin, the method comprising:

preparing crystal particles of a garnet-type ion-conducting oxide represented by the following general formula (B):

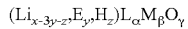

$(Li_{x-3y-z}E_y H_z)L_\alpha M_\beta O_\gamma$      General Formula (B)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 < z \leq 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

preparing a lithium-containing flux;

preparing a resin;

forming a separator material layer comprising a mixture of the crystal particles of the garnet-type ion-conducting oxide, the flux and the resin; and sintering the separator material layer by heating at a temperature of 650° C. or leas.

It is thought that high-temperature sintering by a solid phase flux reaction method, is needed to sinter the garnet-type ion-conducting oxide not subjected to substitution with hydrogen ions. When the oxide sintering temperature is set to high temperature (more than 900° C.), the bonding state between the crystal particles of the sintered garnet-type ion-conducting oxide, which is the oxide electrolyte sintered body, is excellent, and a high ion conductivity is obtained. However, there is a disadvantage that the resin is evaporated by the high temperature heating.

On the other hand, in the case of low temperature sintering that allows the resin to remain in the voids, the bonding state between the crystal particles of the sintered garnet-type ion-conducting oxide is not sufficient, and the resin is left on the bonding surface of the crystal particles of the sintered garnet-type ion-conducting oxide and inhibits ion conductivity.

Even in the case of employing a method in which, at first, only the garnet-type ion-conducting oxide not subjected to substitution with hydrogen ions, is sintered at low temperature and then the voids are filled with the resin, the bonding state between the crystal particles of the sintered garnet-type ion-conducting oxide is poor, and a low ion conductivity is obtained.

Even in the case of employing a method in which the garnet-type ion-conducting oxide not subjected to substitution with hydrogen ions, is sintered at high temperature to form excellent interfaces between the crystal particles and then the voids are filled with the resin, the resin cannot completely fill the voids, and the thus-obtained separator has a high voidage.

As just described, conventional production methods cannot achieve the formation of excellent interfaces between the crystal particles; moreover, they cannot decrease the voidage of the separator thus obtained.

According to the disclosed embodiments, the melted resin is present when the garnet-type ion-conducting oxide subjected to substitution with hydrogen ions, is reacted with the Li-containing flux; therefore, an excellent bonding state can be formed between the garnet-type ion-conducting oxide particles, and the resin can successfully fill the voids formed by the evaporation of the flux. The voids formed by the evaporation of the flux are mainly composed of voids that do not largely inhibit the ion conductivity of the grain boundary triple junctions between the crystal particles of the garnet-type ion-conducting oxide. Therefore, the resin does not inhibit ion conductivity. As a result, the battery separator containing the oxide electrolyte sintered body and the resin is obtained, which has a high ion conductivity and a low voidage.

The battery separator obtained by the production method of the disclosed embodiments, comprises an oxide electrolyte sintered body and a resin.

The battery separator production method of the disclosed embodiments comprises at least the following: (1) preparing garnet-type ion-conducting oxide crystal particles, (2) preparing a flux, (3) preparing a resin, (4) forming a separator material layer, and (5) sintering. The order of the (1) to (3) is not particularly limited, and the (1) to (3) may be carried out in any order or at the same time.

(1) Preparing Garnet-Type Ion-Conducting Oxide Crystal Particles

This is to prepare crystal particles of a garnet-type ion-conducting oxide represented by the following general formula (B):

$(Li_{x-3y-z}, E_y, H_z)L_\alpha M_\beta O_\gamma$ <span></span> General Formula (B)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \le x-3y-z \le 7$, $0 \le y < 0.22$ and $0 < z \le 3.4$; and $\alpha$, $\beta$ and $\gamma$ are real numbers in ranges of $2.5 \le \alpha \le 3.5$, $1.5 \le \beta \le 2.5$ and $11 \le \gamma \le 13$, respectively.

The crystal particles of the garnet-type ion-conducting oxide thus prepared, are particles represented by the general formula (B) and particles subjected to substitution of part of lithium ions with hydrogen ions ($0 < z \le 3.4$ in the general formula (B)).

The composition of the general formula (B) is the same as that of the general formula (A), except that z is a real number satisfying $0 < z \le 3.4$. When z is in a range of $0 < z \le 3.4$, it means that hydrogen is contained.

In this preparing, commercially-available crystal particles or synthesized crystal particles may be used as the garnet-type ion-conducting oxide subjected to substitution with hydrogen ions.

In the case of using the synthesized crystal particles, the preparing of the crystal particles of the garnet-type ion-conducting oxide may include obtaining crystal particles of a garnet-type ion-conducting oxide represented by the following general formula (C) and not subjected to substitution with hydrogen ions, by mixing raw materials to be at a stoichiometric ratio that provides the garnet-type ion-conducting oxide represented by the following general formula (C) and not subjected to substitution with hydrogen ions, and heating the thus-obtained mixture. Moreover, it may include obtaining the garnet type ion-conducting oxide represented by the general formula (B) and subjected to substitution with hydrogen ions, by substituting Li in the thus-obtained garnet-type ion-conducting oxide crystal particles represented by the general formula (C) and not subjected to substitution with hydrogen ions, with protons.

$(Li_{x-3y}, E_y)L_\alpha M_\beta O_\gamma$ <span></span> General Formula (C)

where E is at least one kind of element selected from the group consisting or Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x and y are real numbers satisfying $3 \le x-3y \le 7$ and $0 \le y < 0.22$; and $\alpha$, $\beta$ and $\gamma$ are real numbers in ranges of $2.5 \le \alpha \le 3.5$, $1.5 \le \beta \le 2.5$ and $11 \le \gamma \le 13$, respectively.

Compared to the garnet-type ion-conducting oxide represented by the general formula (B) $((Li_{x-3y-z}, E_y, H_z) L_\alpha M_\beta O_\gamma)$, the garnet-type ion-conducting oxide represented by the general formula (C) $((Li_{x-3y}, E_y) L_\alpha M_\beta O_\gamma)$ corresponds to a compound in which part of Li ions in the general formula (B) are not substituted with hydrogen ions. The garnet-type ion conducting oxide represented by the general formula (C) will not be described here, since it is the same as the garnet-type ion-conducting oxide represented by the general formula (B), except that it is a garnet-type ion-conducting oxide not subjected to substitution with hydrogen ions.

In the case of synthesizing the garnet-type ion-conducting oxide not subjected to substitution with hydrogen ions, for example, it can be obtained by mixing raw materials to be at a stoichiometric ratio that provides the desired garnet-type ion-conducting oxide, and heating the mixture.

As the raw materials for the garnet-type ion-conducting oxide crystal particles, conventionally-known raw materials can be used. As the raw materials, examples include, but are not limited to, $LiOH(H_2O)$, $La(OH)_3$, $Al_2O_3$, $ZrO_2$ and $Nb_2O_5$.

The method for mixing the raw materials is not particularly limited. As the mixing method, examples include, but are not limited to, a mortar, a ball mill, a planetary ball mill and a jet mill.

The heating temperature is not particularly limited, and it may be from room temperature to 1200° C.

The heating atmosphere is not particularly limited.

The heating time is not particularly limited, and it may be from 1 hour to 100 hours.

As the garnet-type ion-conducting oxide represented by the general formula (C) and not subjected to substitution with hydrogen ions, examples include, but are not limited to, $Li_7La_3Zr_2O_{12}$, $Li_{6.4}La_3Zr_{1.4}Nb_{0.6}O_{12}$, $Li_{6.5}La_3Zr_{1.7}Nb_{0.3}O_{12}$, $Li_{6.8}La_3Zr_{1.7}Nb_{0.3}O_{12}$, $(Li_{6.2}Al_{0.2})La_3Zr_{1.7}Nb_{0.3}O_{12}$, $(Li_{5.8}Al_{0.2})La_3(Zr_{1.4}Nb_{0.6})O_{12}$, $(Li_{6.1}Al_{0.13})La_3(Zr_{1.4}Nb_{0.6})O_{12}$, $(Li_{6.3}Al_{0.02})La_3(Zr_{1.4}Nb_{0.6})O_{12}$, and $(Li_{6.2}Ga_{0.2})La_3Zr_{1.7}Nb_{0.3}O_{12}$.

In the production method of the disclosed embodiments, the method for substituting the Li ions in the garnet-type ion-conducting oxide represented by the general formula (Cl and not subjected to substitution with hydrogen ions, with protons, is not particularly limited, as long as the garnet-type ion-conducting oxide represented by the general formula (B) and subjected to substitution with hydrogen ions, can be obtained. From the viewpoint of easily controlling the substitution amount, for example, a powder of the garnet-type ion-conducting oxide represented by the general formula (C) and not subjected to substitution with hydrogen ions, may be stirred and/or immersed in pure water for several minutes to 5 days at room temperature.

The amount of hydrogen ions incorporated by the substitution can be estimated from the amounts of Li ions in the garnet-type ion-conducting oxide before and after being subjected to the substitution, which are amounts obtained by carrying out inductively-coupled plasma (ICP) analysis on the powder of the garnet type ion-conducting oxide before and after the substitution.

That is, the hydrogen ion amount in the garnet type ion-conducting oxide subjected to substitution with hydrogen ions, cannot be quantitated by the inductively-coupled plasma (ICP) analysis; however, the lithium ion amounts in the garnet-type ion-conducting oxide before and after substitution with hydrogen ions, can be quantitated.

Therefore, the amount of lithium ion change before and after the substitution can be calculated from the lithium ion amounts in the garnet-type ion-conducting oxide before and after the substitution. From the amount of the lithium ion change, it is possible to estimate how much lithium ions were substituted with hydrogen ions.

(Quantitative Analysis of Protons)

The method for quantitating the protons in the garnet-type ion-conducting oxide, is not particularly limited. For example, it can be quantitated by using a combination of mass spectrometry (MS) and thermogravimetry (Tg), for example.

In general, the garnet-type ion-conducting oxide used in the disclosed embodiments is present as crystal at normal temperature. The crystal may be in a particulate form.

The number average particle diameter of the crystal particles of the garnet-type ion-conducting oxide is not particularly limited. It may be in a range of from 0.1 μm to 3 μm.

(2) Preparing Flux (Lithium Compound)

This is to prepare a lithium-containing flux.

The lithium-containing flux (a lithium compound) is not particularly limited, and it may be a flux that has a melting point at around a temperature at which hydrogen ions are desorbed from the crystal particles of the garnet-type ion-conducting oxide subjected to substitution with hydrogen ions. As the flux, examples include, but are not limited to, LiOH (melting point: 462° C.), $LiNO_3$ (melting point: 260° C.) and $Li_2SO_4$ (melting point: 859° C.). From the viewpoint of lowering the sintering temperature, the flux may be a flux with a low melting point, and it may be LiOH or $LiNO_3$. As the flux, one or more kinds of fluxes may be used.

The form of the flux may be a particulate form. When the form of the flux is a particulate form, the number average particle diameter of the flux is not particularly limited. From the viewpoint of handling, it may be in a range of from 0.1 μm to 100 μm.

(3) Preparing Resin

The resin prepared here is the same as the resin described above under "1. Battery separator". The resin may be a resin that melts and does not thermally decompose in the below-described sintering. That is, as described above, the resin may be a resin with a lower melting temperature and a higher thermal decomposition temperature than the heating (sintering) temperature.

(4) Forming Separator Material Layer

This is to form a separator material layer comprising a mixture of the crystal particles of the garnet-type ion-conducting oxide, the flux and the resin.

In the separator material layer, the content of the crystal particles of the garnet-type ion-conducting oxide subjected to substitution with hydrogen ions, may be in a range of from 1 vol % to 99 vol %, when the total volume of the separator material layer is determined as 100 vol %.

In the separator material layer, the content of the flux may be in a range of from 1 vol % to 99 vol %, when the total volume of the separator material layer is determined as 100 vol %.

In the separator material layer, the content of the resin may be 1 vol % or more, may be 50 vol % or less, may be 25 vol % or less, or may be less than 5 vol %, when the total volume of the separator material layer is determined as 100 vol %. Also, the content of the resin in the separator material layer may be an amount that is equivalent to the amount of the flux evaporated at the time of sintering described below.

The method for mixing the flux, the resin and the crystal particles of the garnet-type ion-conducting oxide subjected to substitution with hydrogen ions, is not particularly limited. As the method, examples include, but are not limited to, a mortar, a stirrer and a homogenizer (including an ultrasonic homogenizer).

The mixing ratio of the garnet-type ion-conducting oxide subjected to substitution with hydrogen ions and the flux, is not particularly limited. It may be in a range of from 50:50 (vol %) to 95:5 (vol %), or the molar amount of the lithium in the composition of the flux may be equal to the molar amount of the hydrogen in the composition of the garnet-type ion-conducting oxide subjected to substitution with hydrogen ions.

The separator material layer may be formed after mixing the flux, the garnet-type ion-conducting oxide subjected to substitution with hydrogen ions, and the resin. From the viewpoint of forming excellent interfaces of the crystal particles of the sintered garnet-type ion-conducting oxide, the separator material layer may be formed as follows: the flux and the garnet-type ion-conducting oxide subjected to substitution with hydrogen ions are mixed; the mixture is applied to a substrate or the like; the applied mixture is dried to form a dry layer; and the resin is incorporated in the dry layer, thereby forming the separator material layer.

(5) Sintering

This is to sinter the separator material layer by heating at a temperature of 650° C. or less.

In the sintering, the upper limit of the heating temperature may be 650° C. or less, or it may be 550° C. or less. The lower limit may be equal to or more than the melting point of the flux. The heating temperature may be 350° C. or more, or it may be 400° C. or more, from the viewpoint of promoting the resubstitution of, with the lithium ions in the lithium-containing flux, the protons in the crystal particles of the garnet-type ion-conducting oxide subjected to substitution with hydrogen ions.

In the sintering, a pressure is applied at the time of heating. The pressure is not particularly limited. The heating may be carried out under an atmospheric pressure condition or higher. From the viewpoint of increasing the lithium ion conductivity of the sintered garnet-type ion-conducting oxide, the heating may be carried out under a higher pressure condition than the atmospheric pressure. At the time of heating, the upper limit of the pressure is not particularly limited. For example, it may be 6 ton/cm$^2$ ($\approx$588 MPa) or less.

In the sintering, the heating atmosphere is not particularly limited.

From the viewpoint of densification of the battery separator, the sintering may be carried out by hot-pressing.

As used herein, the hot-pressing is a method of carrying out heating in an atmosphere-controlled furnace, with applying a pressure in a uniaxial direction.

By the hot-pressing, the sintered garnet-type ion-conducting oxide causes plastic deformation and thus densification. As a result, it is considered that the density of the sintered garnet-type ion-conducting oxide increases along with an increase in the bonding of the crystal particles, thereby increasing the lithium ion conductivity of the sintered garnet-type ion-conducting oxide.

For the hot-pressing temperature, the upper limit may be 650° C. or less, or it may be 550° C. or less. The lower limit may be equal to or more than the melting point of the flux. The hot-pressing temperature may be 350° C. or more, or it may be 400° C. or more, from the viewpoint of promoting the resubstitution of, with the lithium ions in the lithium-containing flux, the protons in the crystal particles of the garnet-type ion-conducting oxide subjected to substitution with hydrogen ions.

The hot-pressing pressure may be in a range of from 1 ton/cm$^2$ to 6 ton/cm$^2$ ($\approx$from 98 MPa to 588 MPa).

The hot-pressing time may be in a range of from 1 minute to 600 minutes.

In the production method according to the disclosed embodiments, the crystal particles of the garnet-type ion-conducting oxide subjected to substitution with hydrogen ions, are mixed with the lithium-containing flux. By heating the thus-obtained mixture, the protons in the crystal particles of the garnet-type ion-conducting oxide subjected to substitution with hydrogen ions, can be resubstituted with the lithium ions in the flux. By use of the chemical reaction caused in this resubstitution, the crystal particles of the garnet-type ion-conducting oxide can be bonded at lower temperature than ever before (e.g., at 350° C.).

Also, according to the disclosed embodiments, the bonding of the crystal particles of the garnet-type ion-conducting oxide is carried out simultaneously with the introducing of the resin into the voids of the garnet-type ion-conducting oxide formed by the bonding. Therefore, the battery separator in which the resin is incorporated into the voids of the crystal particles of the sintered garnet-type ion-conducting oxide, is formed, and the voidage of the battery separator can be decreased.

Hereinafter, an example of the method for producing the battery separator of the disclosed embodiments, will be described.

First, the garnet-type ion-conducting oxide subjected to substitution with hydrogen ions, is immersed in a solution of the lithium-containing flux, thereby preparing a slurry.

The obtained slurry is applied to a substrate.

Then, the applied slurry is dried to solidify the flux, thereby forming the separator material layer.

The resin is applied on the separator material layer.

Then, the separator material layer is heated to cause a reaction between the flux and the garnet-type ion-conducting oxide subjected to substitution with hydrogen ions, thereby bonding the crystal particles of the garnet-type ion-conducting oxide. At this time, the resin is cured to increase the hardness of the separator material layer further and fill the voids of the sintered garnet-type ion-conducting oxide. Therefore, the battery separator in which the voids of the garnet-type ion-conducting oxide sintered body are filled with the resin, is obtained.

As described above, according to the disclosed embodiments, the voids of the garnet-type ion-conducting oxide sintered body are increased by the evaporation of the flux, and the voids are filled with the resin. Therefore, the voidage of the battery separator can be decreased; the battery separator can be densified; and desired ion conductivity can be obtained.

The battery separator obtained by the production method of the disclosed embodiments can be used as the battery separator of various kinds of batteries.

For example, the battery separator may be used in a lithium battery.

3. Lithium Battery

The lithium battery of the disclosed embodiments, is a lithium battery comprising a cathode, an anode, and an electrolyte layer that is disposed between the cathode and the anode and comprises the battery separator.

Figure 3:
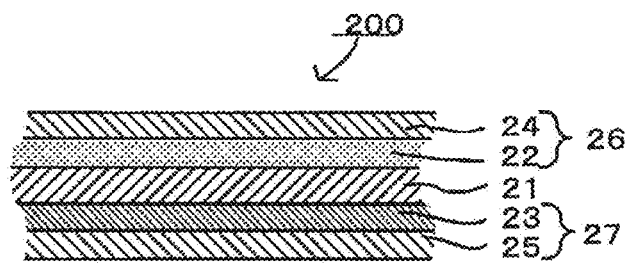
FIG. 3 is a schematic sectional view of an example of the lithium battery according to the disclosed embodiments.

FIG. 3 is a view of an example of the lithium battery according to the disclosed embodiments, and it is also a schematic sectional view in the laminating direction of the lithium battery. The lithium battery of the disclosed embodiments is not limited to this example.

A lithium battery 200 comprises a cathode 26, an anode 27 and an electrolyte layer 21, the cathode 26 comprising a cathode active material layer 22 and a cathode current collector 24, the anode 27 comprising an anode active material layer 23 and an anode current collector 25, and the electrolyte layer 21 being disposed between the cathode 26 and the anode 27.

In the disclosed embodiments, "lithium battery" is not limited to a battery in which a lithium metal is used in the anode. It is a concept that encompasses a lithium ion battery in which an anode active material other than a lithium metal is used in the anode and which enables charge and discharge by charge transfer along with lithium ion transfer between the cathode and the anode.

The lithium battery may be a primary or secondary battery.

The cathode comprises at least a cathode active material layer containing a cathode active material. As needed, the cathode may comprise a cathode current collector and a cathode lead connected to the cathode current collector.

As the cathode active material, examples include, but are not limited to, $LiNi_{0.5}Mn_{1.5}O_4$, $LiCoO_2$, $LiNi_{1/3}Mn_{1/3}Co_{1/3}O_2$, $LiNiO_2$, $LiMn_2O_4$, $LiCoMnO_4$, $Li_2NiMn_3O_8$, $LiCoPO_4$, $Li_3Fe_2(PO_4)_3$ and $Li_3V_2(PO_4)_3$.

The form of the cathode active material is not particularly limited. The cathode active material may be in a particulate form. When the cathode active material is in a particulate form, the number average particle diameter of the cathode active material particles may be from 1 µm to 20 µm. This is because poor handleability may be obtained when the number average particle diameter of the cathode active material particles is too small, and it may be difficult to obtain a flat cathode active material layer when the number average particle diameter of the cathode active material particles is too large.

The content ratio of the cathode active material in the cathode active material layer is generally from 50 mass % to 90 mass %, when the total mass of the cathode active material layer is determined as 100 mass %.

As needed, the cathode active material layer may contain a conductive material, a binder, etc.

The conductive material is not particularly limited, as long as it can increase the electroconductivity of the cathode active material layer. As the conductive material, examples include, but are not limited to, carbon black such as acetylene black and Ketjen Black, carbon nanotubes (CNT) and carbon nanofibers (CNF). The content ratio of the conductive material in the cathode active material layer varies depending on the type of the conductive material. It is generally from 1 mass % to 30 mass %, when the total mass of the cathode active material layer is determined as 100 mass %.

As the binder, examples include, but are not limited to, polyvinylidene fluoride (PVdF), polytetrafluoroethylene (PTFE), butylene rubber (BR) and styrene-butadiene rubber (SBR). The content ratio of the binder in the cathode active material layer may be such a content ratio that can fix the cathode active material, etc. The content ratio of the binder is generally from 0.5 mass % to 10 mass %, when the total mass of the cathode active material layer is determined as 300 mass %.

The thickness of the cathode active material layer varies depending on the intended application of the battery, etc. It may be from 10 µm to 250 µm, from 20 µm to 200 µm, or from 30 µm to 150 µm.

The cathode current collector functions to collect current from the cathode active material layer.

As the raw material for the cathode current collector, examples include, but are not limited to, aluminum, SUS, nickel, chromium, gold, zinc, iron and titanium.

As the form of the cathode current collector, examples include, but are not limited to, a foil form, a plate form and a mesh form.

The method for producing the cathode is not particularly limited. As the method, examples include, but are not limited to, the following method: the cathode active material is dispersed in a dispersion medium to prepare a slurry, and the slurry is applied onto the cathode current collector, dried and roll-pressed, thereby producing the cathode.

The dispersion medium is not particularly limited. As the dispersion medium, examples include, but are not limited to, butyl acetate, heptane and N-methyl-2-pyrrolidone.

As the method for applying the slurry, examples include, but are not limited to, a doctor blade method, a metal mask printing method, an electrostatic coating method, a dip coating method, a spray coating method, a roller coating method, a gravure coating method and a screen printing method.

After the cathode active material layer is formed, the cathode active material layer may be pressed to increase electrode density.

The anode comprises the anode active material layer containing the anode active material. As needed, the anode comprises an anode current collector and an anode lead connected to the anode current collector.

The anode active material is not particularly limited, as long as it can occlude and release lithium ions. As the anode active material, examples include, but are not limited to, a lithium metal, a lithium alloy, a metal oxide containing a lithium element, a metal sulfide containing a lithium element, a metal nitride containing a lithium element, and a carbonaceous material such as graphite.

As the lithium alloy, examples include, but are not limited to, a lithium-aluminum alloy, a lithium-tin alloy, a lithium-lead alloy, and a lithium-silicon alloy.

As the metal oxide containing a lithium element, examples include, but are not limited to, a lithium titanium oxide.

As the metal nitride containing a lithium element, examples include, but are not limited to, a lithium cobalt nitride, a lithium iron nitride and a lithium manganese nitride.

Also, a lithium metal coated with a solid electrolyte may be used.

As needed, the anode active material layer may contain a conductive material, a binder, etc.

The details of the conductive material and binder are the same as the conductive material and binder of the above-described cathode active material layer.

The thickness of the anode active material layer is not particularly limited. For example, it may be from 10 µm to 100 µm or from 10 µm to 50 µm.

The anode current collector functions to collect current from the anode active material layer. As the raw material for the anode current collector, examples include, but are not limited to, SUS, Cu, Ni, Fe, Ti, Co and Zn.

As the form of the anode current collector, examples include, but are not limited to, the above-described examples of the form of the cathode current collector.

The method for producing the anode is not particularly limited, as long as it is a method by which the anode is obtained. After the anode active material layer is formed, the anode active material layer may be pressed to increase electrode density.

The electrolyte layer is disposed between the cathode and the anode and functions to exchange lithium ions between the cathode and the anode.

The electrolyte layer comprises at least the battery separator of the disclosed embodiments. As needed, the electrolyte layer may comprise at least one kind of electrolyte selected from the group consisting of a liquid electrolyte, a gel electrolyte and a solid electrolyte.

The battery separator of the disclosed embodiments functions to prevent contact between the cathode active material layer and the anode active material layer and to retain the electrolyte. In addition, it functions to exchange lithium ions between the cathode and the anode. Therefore, the battery separator of the disclosed embodiments functions as the solid electrolyte layer of an all-solid-state battery.

The battery separator of the disclosed embodiments may be impregnated with an electrolyte such as the above-described liquid electrolyte.

The thickness of the battery separator of the disclosed embodiments will not be described here, since it is the same as described above.

As the liquid electrolyte, examples include, but are not limited to, a non-aqueous liquid electrolyte and an aqueous liquid electrolyte.

As the non-aqueous liquid electrolyte, generally, one containing a lithium salt and a non-aqueous solvent is used.

As the lithium salt, examples include, but are not limited to, inorganic lithium salts such as $LiPF_6$, $LiBF_4$, $LiClO_4$ and $LiAsF_6$, and organic lithium salts such as $LiCF_3SO_3$, $LiN(SO_2CF_3)_2$(Li-TFSI), $LiN(SO_2C_2F_6)_2$ and $LiC(SO_2CF_3)_2$.

As the non-aqueous solvent, examples include, but are not limited to, ethylene carbonate (EC), propylene carbonate (PC), butylene carbonate (BC), dimethyl carbonate (DMC), diethyl carbonate (DEC), ethyl methyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and mixtures thereof.

The concentration of the lithium salt in the non-aqueous liquid electrolyte is in a range of from 0.5 mol/L to 3 mol/L, for example.

As the non-aqueous solvent, for example, an ionic liquid may be used. As the ionic liquid, examples include, but are not limited to, N-methyl-N-propylpiperidinium bis(trifluoromethanesulfonyl)amide (PP13TFSA), N-methyl-N-propylpyrrolidinium bis(trifluoromethanesulfonyl)amide (P13TFSA), N-butyl-N-methylpyrrolidinium bis(trifluoromethanesulfonyl)amide (P14TFSA), N,N-diethyl-N-methyl-N-(2-methoxyethyl)ammonium bis(trifluoromethanesulfonyl)oxide (DEMETFSA) and N,N,N-trimethyl-N-propylammonium bis(trifluoromethanesulfonyl)amide (TMPATFSA).

As the aqueous liquid electrolyte, generally, one containing a lithium compound and water is used. As the lithium compound, examples include, but are not limited to, lithium compounds such as LiOH, LiCl, $LiNO_3$ and $CH_3CO_2Li$.

The gel electrolyte is generally a non-aqueous liquid electrolyte gelled by addition of a polymer.

More specifically, the gel electrolyte is obtained by gelling the above-mentioned non-aqueous liquid electrolyte by addition of a polymer such as polyethylene oxide, polypropylene oxide, polyacrylonitrile, polyvinylidene fluoride (PVdF), polyurethane, polyacrylate or cellulose.

As the solid electrolyte, examples include, but are not limited to, a sulfide-based solid electrolyte, an oxide-based solid electrolyte and a polymer electrolyte.

As the sulfide-based solid electrolyte, examples include, but are not limited to, $Li_2S$—$P_2S_5$, $Li_2S$—$P_2S_3$, $Li_2S$—$P_2S_3$—$P_2S_5$, $Li_2S$—$SiS_2$, $Li_2S$—$Si_2S$, $Li_2S$—$B_2S_3$, $Li_2S$—$GeS_2$, $LiI$—$Li_2S$—$P_2S_5$, $LiI$—$Li_2S$—$SiS_2$—$P_2S_5$, $Li_2S$—$SiS_2$—$Li_4SiO_4$, $Li_2S$—$SiS_2$—$Li_3PO_4$, $Li_3PS_4$—$Li_4GeS_4$, $Li_{3.4}P_{0.6}Si_{0.4}S_4$, $Li_{3.25}P_{0.25}Ge_{0.76}S_4$, and $Li_{4-x}Ge_{1-x}P_xS_4$.

As the oxide-based solid electrolyte, examples include, but are not limited to, LiPON (lithium phosphate oxynitride), $Li_{1.3}Al_{0.3}Ti_{0.7}(PO_4)_3$, $La_{0.51}Li_{0.34}TiO_{0.74}$, $Li_3PO_4$, $Li_2SiO_2$, and $Li_2SiO_4$.

The polymer electrolyte generally contains a lithium compound and a polymer.

As the lithium compound, examples include, but are not limited to, the above-mentioned inorganic lithium compounds and organic lithium compounds. The polymer is not particularly limited, as long as it is capable of forming a complex with a lithium compound. As the polymer, examples include, but are not limited to polyethylene oxide.

The lithium battery of the disclosed embodiments may comprise a battery casing for storing the cathode, the electrolyte layer, the anode, etc.

As the form of the battery casing, examples include, but are not limited to, a coin form, a flat plate form, a cylindrical form and a laminate form.

The method for producing the lithium battery according to the disclosed embodiments, is a method for producing a lithium battery comprising a cathode, an anode, and an electrolyte layer that is disposed between the cathode and the anode and comprises the battery separator.

The method for producing the lithium battery of the disclosed embodiments is not particularly limited, as long as the electrolyte layer is disposed between the cathode and the anode.

The raw materials for the cathode, the electrolyte layer and the anode will not be described here, since they are the same as those described above regarding the lithium battery.

EXAMPLES

1. Production of Garnet-Type Ion-Conducting Oxide Sintered Body

Reference Experimental Example 1

[Synthesis of Garnet-Type Ion-Conducting oxide]

Stoichiometric amounts of $LiOH(H_2O)$ (manufactured by Sigma-Aldrich), $La(OH)_3$ (manufactured by Kojundo Chemical Laboratory Co., Ltd.), $ZrO_2$ (manufactured by Kojundo Chemical Laboratory Co., Ltd.) and $Nb_2O_5$ (manufactured by Kojundo Chemical Laboratory Co., Ltd.) were used as starting raw materials and mixed to obtain a mixture.

The mixture and a flux (NaCl) were heated from room temperature to 950° C. for 8 hours and then kept at 950° C. for 20 hours, thereby obtaining crystal particles of a garnet-type ion-conducting oxide not subjected to substitution with hydrogen ions, the oxide having the composition of $Li_{6.8}La_3Zr_{1.7}Nb_{0.3}O_{12}$.

[Substitution with Hydrogen Ions]

Then, at room temperature, 2 g of the thus-obtained crystal particles of the garnet-type ion-conducting oxide not subjected to substitution with hydrogen ions, were immersed in pure water (200 ml) for several minutes to substitute part of lithium ions with hydrogen ions, thereby obtaining the crystal particles of the garnet-type ion-conducting oxide subjected to substitution with hydrogen ions, the oxide having the composition of $Li_{5.4}H_{1.4}La_3Zr_{1.7}Nb_{0.3}O_{12}$. In the composition of the garnet-type ion-conducting oxide, the amount of Li substituted with H was 1.4.

The crystal particles of the garnet-type ion-conducting oxide were subjected to ICP analysis before and after the substitution with hydrogen ions. From the amount of change in the lithium element in the composition of the garnet-type ion-conducting oxide before and after being subjected to the substitution with hydrogen ions, the amount of hydrogen ions incorporated by the substitution was estimated. Then, the composition of the garnet-type ion-conducting oxide crystal particles subjected to substitution with hydrogen ions, was estimated.

[Sintering (Resubstitution)]

The $Li_{5.4}H_{1.4}La_3Zr_{1.7}Nb_{0.3}O_{12}$ crystal particles subjected to substitution with hydrogen ions and a powder of $LiNO_3$ were weighed in a volume ratio of 75:25. Then, they were dry-mixed in a mortar to obtain a mixed powder. The mixed powder was pressed at room temperature (load: 1 ton/cm² (≈98 MPa)) to obtain a pressed powder. The pressed powder was heated at 500° C. for 20 hours under a normal pressure condition, thereby obtaining a garnet-type ion-conducting oxide sintered body.

Reference Experimental Example 2

A garnet-type ion-conducting oxide sintered body was produced in the same manner as Reference Experimental Example 1, except that in the sintering, the pressed powder was heated at 400° C. for 12 hours under a pressure condition (load: 1 ton/cm² (≈98 MPa)) to obtain the sintered body.

Reference Experimental Example 3

A garnet-type ion-conducting oxide sintered body was produced in the same manner as Reference Experimental Example 1, except that LiOH was used as the flux, and then the sintering was carried out.

Reference Experimental Example 4

A garnet-type ion-conducting oxide sintered body was produced in the same manner as Reference Experimental Example 1, except that $Li_{6.8}La_3Zr_{1.7}Nb_{0.3}O_{12}$ crystal particles not subjected to substitution with hydrogen ions, were sintered without being subjected to substitution with hydrogen ions.

Reference Experimental Example 5

A garnet-type ion-conducting oxide sintered body was produced in the same manner as Reference Experimental Example 1, except the following points.

Crystal particles of a garnet-type ion-conducting oxide subjected to substitution with hydrogen ions, the oxide having the composition of $Li_{3.0}H_{2.8}Al_{0.2}La_3Zr_{1.4}Nb_{0.5}O_{12}$, were prepared.

The crystal particles of the garnet-type ion-conducting oxide subjected to substitution with hydrogen ions, the oxide having the composition of $Li_{3.0}H_{2.8}Al_{0.2}La_3Zr_{1.4}Nb_{0.6}O_{12}$, and a powder of $LiNO_3$ were weighed so that the amount of the $LiNO_3$ powder was 1.1 times (3.08 $LiNO_3$) the amount of H (2.8) in the composition ($Li_{3.0}H_{2.8}Al_{0.2}La_3Zr_{1.4}Nb_{0.6}O_{12}$) of the garnet-type ion-conducting oxide subjected to substitution with hydrogen ions. Then, the crystal particles and the $LiNO_3$ powder were dry-mixed in a mortar to obtain a mixed powder. The mixed powder was hot-pressed under conditions of 400° C. and 1 ton/cm³ for 480 minutes, thereby obtaining a garnet-type ion-conducting oxide sintered body.

[Lithium Ion Conductivity]

Lithium ion conductivity measurement was carried out on the garnet-type ion-conducting oxide sintered bodies produced in Reference Experimental Examples 1 to 5. Their lithium ion conductivities were measured by an AC impedance measurement method, with the use of POTENTIOSTAT 1470 (product name, manufactured by Solartron) and IMPEDANCE ANALYZER FRA1255B (product name, manufactured by Solartron) and under conditions of a voltage swing of 25 mV, a measurement frequency (F) of from 0.1 Hz to 1 MHz, a measurement temperature of 25° C., and normal pressure.

For the garnet-type ion-conducting oxide sintered bodies produced in Reference Experimental Examples 1 to 5, the lithium ion conductivities are as follows: $8.0 \times 10^{-6}$ S/cm in Reference Experimental Example 1, $1.1 \times 10^{-4}$ S/cm in Reference Experimental Example 2, $8.0 \times 10^{-5}$ S/cm in Reference Experimental Example 3, $9.0 \times 10^{-7}$ S/cm in Reference Experimental Example 4, and $4.7 \times 10^{-5}$ S/cm in Reference Experimental Example 5.

[AC Impedance Measurement]

From the results of the AC impedance measurement, the ratio $R_{gb}/(R_b+R_{gb}=R_{total})$ of the grain boundary resistance value $R_{gb}$ with respect to the total resistance value $R_b+R_{gb}=R_{total}$ (the sum of the intragranular resistance value $R_b$ and the grain boundary resistance value $R_{gb}$) was calculated for each of the garnet-type ion-conducting oxide sintered bodies produced in Reference Experimental Examples 1 to 5.

For the garnet-type ion-conducting oxide sintered bodies of Reference Experimental Examples 1 to 5, the values of $R_{gb}/(R_b+R_{gb}=R_{total})$ are as follows: 0.60 in Reference Experimental Example 1, 0.55 in Reference Experimental Example 2, 0.40 in Reference Experimental Example 3, 0.95 in Reference Experimental Example 4, and 0.44 in Reference Experimental Example 5.

The arc endpoint frequencies (Hz), which indicate a grain boundary resistance component, are as follows: 1000 Hz in Reference Experimental Examples 1 to 3 and 5, and 100 Hz in Reference Experimental Example 4.

A reason for the higher lithium ion conductivities of Reference Experimental Examples 1 to 3 and 5 than the lithium ion conductivity of Reference Experimental Example 4, is because the ratio $R_{gb}/(R_b+r_{gb}=R_{total})$ of the grain boundary resistance value $R_{gb}$ with respect to the total resistance value $R_{total}$ is as low as 0.6 or less.

The reason for the low grain boundary resistance ratios is presumed as follows: since the arc endpoint frequencies (Hz) differ, which indicate the grain boundary resistances, the states of the grain boundaries of the oxide electrolyte sintered bodies of Reference Experimental Examples 1 to 3 and 5, differ from Reference Experimental Example 1.

Therefore, it is presumed that in the case of the separator containing the oxide electrolyte sintered body used in the disclosed embodiments, the ratio $R_{gb}/(R_b+R_{gb}=R_{total})$ of the garnet-type ion-conducting oxide sintered body contained in the separator, satisfies the condition of 0.6 or less.

Reference Experimental Example 6

Crystal particles of a garnet-type ion-conducting oxide not subjected to substitution with hydrogen ions, the oxide having the composition of $Li_{6.4}La_3Zr_{1.4}Nb_{0.6}O_{12}$, were obtained in the same manner as Reference Experimental Example 1.

At room temperature, 2.0 g of the thus-obtained crystal particles of the garnet-type ion-conducting oxide not subjected to substitution with hydrogen ions, were immersed in pure water (500 mL) for 48 hours to substitute part of Li ions with hydrogen ions, thereby obtaining the crystal particles of the garnet-type ion-conducting oxide subjected to substitution with hydrogen ions, the oxide having the composition of $Li_{3.0}H_{3.4}La_3Zr_{1.4}Nb_{0.6}O_{12}$.

Therefore, it is clear that the garnet-type ion-conducting oxide subjected to substitution with hydrogen ions is obtained, in which the hydrogen (H) content ratio z in the general formula (B) is 3.4.

It is thought that if the resin is present at the time of sintering in Reference Experimental Examples 1 to 3 and 5, the resin enters voids formed at the time of sintering, and the voids are filled with the resin. Therefore, the separator of the disclosed embodiments is presumed to have a low voidage and excellent ion conductivity.

Reference Experimental Example 7

Crystal particles of a garnet-type ion-conducting oxide not subjected to substitution with hydrogen ions, the oxide having the composition of $Li_{0.4}La_3Zr_{1.4}Nb_{0.6}O_{12}$, were obtained in the same manner as Reference Experimental Example 1.

For the crystal particles of the garnet-type ion-conducting oxide not subjected to substitution with hydrogen ions, the number average particle diameter was 2.8 μm.

Figure 4:
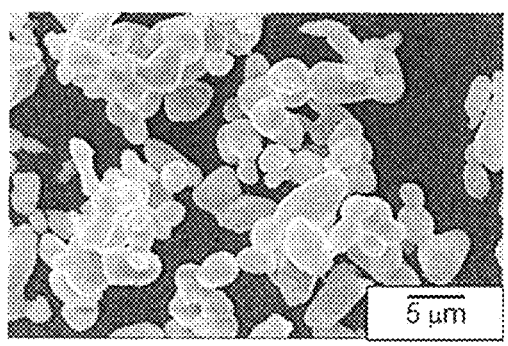
FIG. 4 is a SEM image of crystal particles of a garnet-type ion-conducting oxide not subjected to substitution with hydrogen ions of Reference Experimental Example 7.

FIG. 4 is a SEM image of the thus-obtained crystal particles of the garnet-type ion-conducting oxide not subjected to substitution with hydrogen ions.

[Substitution with Hydrogen Ions]

Then, at room temperature, 2 g of the thus-obtained crystal particles of the garnet-type ion-conducting oxide not subjected to substitution with hydrogen ions, were immersed in pure water (200 ml) for several minutes to substitute, with hydrogen ions, part of the lithium ions of the garnet-type ion-conducting oxide not subjected to substitution with hydrogen ions, thereby obtaining the crystal particles of the garnet-type ion-conducting oxide subjected to substitution with hydrogen ions, the oxide having the composition of $Li_{5.5}H_{0.9}La_3Zr_{1.4}Nb_{0.6}O_{12}$.

[Sintering (Resubstitution)]

The $Li_{5.5}H_{0.9}La_3Zr_{1.4}Nb_{0.6}O_{12}$ crystal particles subjected to substitution with hydrogen ions and 0.9 mol of LiOH were dry-mixed in a mortar to obtain a mixed powder.

The amount of the flux was controlled so that the amount of the flux and the amount of hydrogen were at a stoichiometric ratio of 1:1.

The number average particle diameter of the LiOH was 5 μm.

As a solvent, 2-butanol was added to the mixed powder. A green sheet was produced.

The thus-obtained green sheet was heated at 400° C. for 8 hours in an argon atmosphere under a normal pressure condition, thereby obtaining a garnet-type ion-conducting oxide sintered body.

Figure 5:
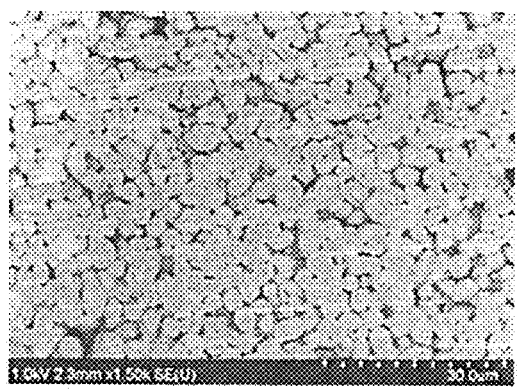
FIG. 5 is a SEM image of a garnet-type ion-conducting oxide sintered body of Reference Experimental Example 7.

FIG. 5 is a SEM image of the garnet-type ion-conducting oxide sintered body obtained by heating.

From FIG. 5, the following facts are found: there are grain boundaries between the crystal particles; the number average particle diameter of the crystal particles is 3 μm or less; and the form of the crystal particles is retained.

REFERENCE SIGNS LIST

11. Garnet-type ion-conducting oxide sintered body
12. Resin
21. Electrolyte layer
22. Cathode active material layer
23. Anode active material layer
24. Cathode current collector
25. Anode current collector
26. Cathode
27. Anode
100. Battery separator
200. Lithium battery

The invention claimed is:

1. A battery separator comprising an oxide electrolyte sintered body and a resin,
wherein the oxide electrolyte sintered body has grain boundaries between crystal particles of a garnet-type ion-conducting oxide represented by the following general formula (A):

$$(Li_{x-3y-z},E_y,H_z)L_\alpha M_\beta O_\gamma \qquad \text{General Formula (A)}$$

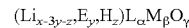

where E is at least one element selected from the group consisting of Al, Ga, Fe and Si; L is at least one element selected from the group consisting of an alkaline-earth metal and a lanthanoid element; M is at least one element selected from a transition element that can be six-coordinated with oxygen and elements in groups 12 to 15 of the periodic table; x, y and z are real numbers satisfying $3 \leq x-3y-z \leq 7$, $0 \leq y < 0.22$ and $0 \leq z < 3.4$; and α, β and γ are real numbers in ranges of $2.5 \leq \alpha \leq 3.5$, $1.5 \leq \beta \leq 2.5$ and $11 \leq \gamma \leq 13$, respectively;
wherein a number average particle diameter of the crystal particles is 3 μm or less;
wherein the oxide electrolyte sintered body satisfies the following formula 1:

$$R_{gb}/(R_b+R_{gb}) \leq 0.6 \qquad \text{Formula 1}$$

where $R_b$ is an intragranular resistance value that is an ion conductivity resistance inside the crystal particles, and $R_{gb}$ is a grain boundary resistance value that is an ion conductivity resistance of the grain boundaries between the crystal particles; and
wherein the resin is contained in grain boundary triple junctions between the crystal particles of the oxide electrolyte sintered body.

2. The battery separator according to claim 1, wherein the resin is a resin that can melt at 350° C. or less.

3. The battery separator according to claim 1, wherein a thermal decomposition temperature of the resin is 400° C. or more.

4. A lithium battery comprising a cathode, an anode, and an electrolyte layer that is disposed between the cathode and the anode and comprises the battery separator defined by claim 1.

5. A method for producing a battery separator comprising an oxide electrolyte sintered body and a resin, the method comprising:
preparing crystal particles of a garnet-type ion-conducting oxide represented by the following general formula (B):

$$(Li_{x-3y-z},E_y,H_z)L_\alpha M_\beta O_\gamma \qquad \text{General Formula (B)}$$

where E is at least one element selected from the group consisting of Al, Ga, Fe and Si; L is at least one element selected from the group consisting of an alkaline-earth metal and a lanthanoid element; M is at least one element selected from a transition element that can be six-coordinated with oxygen and elements in groups 12 to 15 of the periodic table; x, y and z are real numbers satisfying $3 \leq x-3y-z \leq 7$, $0 \leq y < 0.22$ and $0 < z \leq 3.4$; and α, β and γ are real numbers in ranges of $2.5 \leq \alpha \leq 3.5$, $1.5 \leq \beta \leq 2.5$ and $11 \leq \gamma \leq 13$, respectively;
preparing a lithium-containing flux;
preparing a resin;
forming a separator material layer comprising a mixture of the crystal particles of the garnet-type ion-conducting oxide, the flux and the resin;

sintering the separator material layer by heating at a temperature of 650° C. or less;

wherein the battery separator satisfies the following formula 1:

$$R_{gb}/(R_b+R_{gb}) \leq 0.6 \qquad \text{Formula 1}$$

where $R_b$ is an intragranular resistance value that is an ion conductivity resistance inside the crystal particles, and $R_{gb}$ is a grain boundary resistance value that is an ion conductivity resistance of the grain boundaries between the crystal particles; and wherein the resin is contained in grain boundary triple junctions between the crystal particles of the oxide electrolyte sintered body.

6. The method for producing the battery separator according to claim 5, wherein the heating temperature is 350° C. or more in the sintering.

7. The method for producing the battery separator according to claim 5, wherein the resin is a resin that melts and does not thermally decompose in the sintering.

8. A method for producing a lithium battery comprising a cathode, an anode, and an electrolyte layer that is disposed between the cathode and the anode and comprises a battery separator obtained by the production method defined by claim 5.

* * * * *